May 14, 1940.　　　C. V. LINDLEY　　　2,200,697
AUTOMATIC SHUT-OFF VALVE
Filed Oct. 13, 1938　　　2 Sheets-Sheet 1
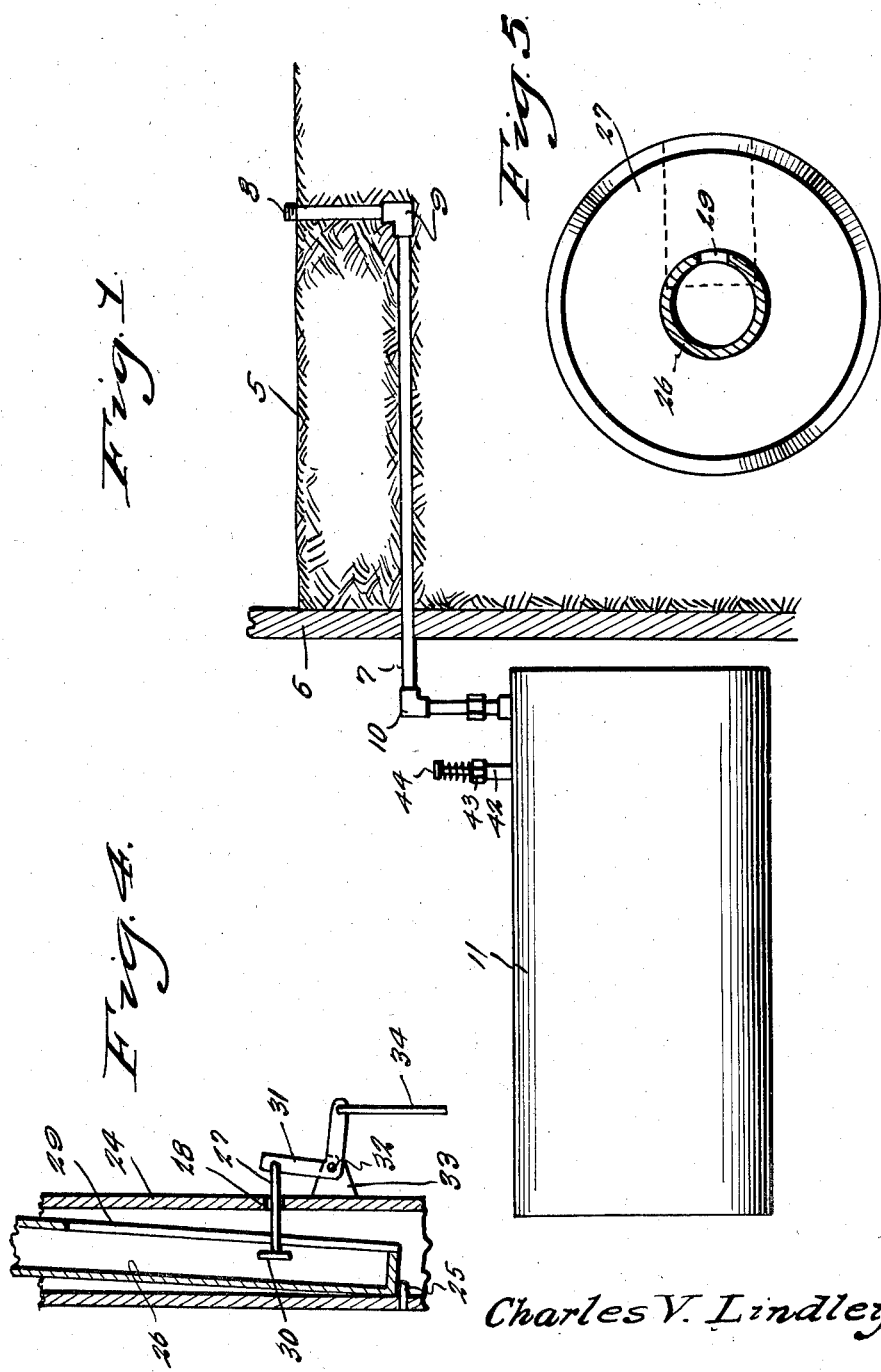
Inventor
Charles V. Lindley
By Clarence A. O'Brien
and Hyman Berman
Attorneys May 14, 1940.  C. V. LINDLEY  2,200,697
AUTOMATIC SHUT-OFF VALVE
Filed Oct. 13, 1938  2 Sheets-Sheet 2
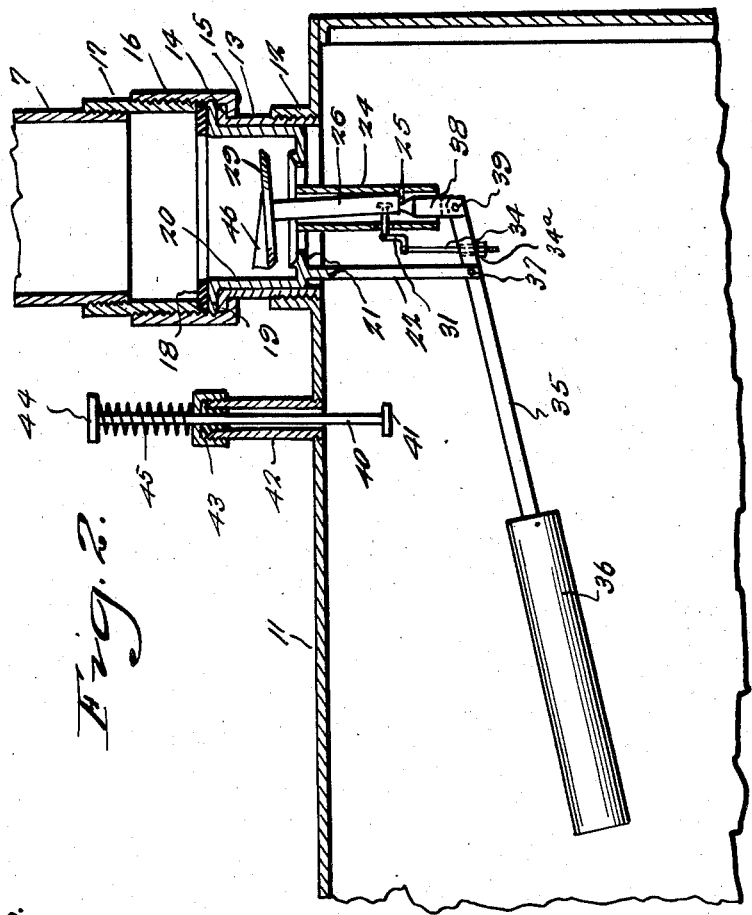
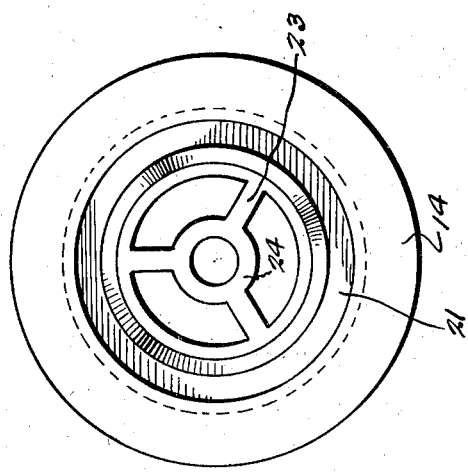
Inventor
Charles V. Lindley
By Clarence A. O'Brien
and Hyman Berman
Attorneys Patented May 14, 1940

2,200,697

UNITED STATES PATENT OFFICE 2,200,697

AUTOMATIC SHUT-OFF VALVE

Charles V. Lindley, Flint, Mich., assignor of thirty-three and one-third per cent to Robert D. Scott, Flint, Mich.

Application October 13, 1938, Serial No. 234,825

3 Claims. (Cl. 137—68)

This invention appertains to new and useful improvements in an automatic shut-off valve and more particularly to valves such as are used in oil storage tanks, of which there are a considerable number used today in view of the widely used oil burners for heating homes and other buildings.

The princpial object of the present invention is to provide an automatic valve which will shut off the conduit to the tank when the tank is being filled, leaving the conduit and hose full, wherein further means is provided for draining the contents of the conduit and hose into the tank subsequently.

Another important object of the invention is to provide an apparatus of the character stated which will be automatic in use and not susceptible to the ready development of defects.

These and other objects and advantages of the invention will become apparent to the reader of the following specification.

In the drawings,

Figure 1 represents a side elevational view of a tank showing the filler pipe leading thereto.

Figure 2 is a fragmentary detailed sectional view through the valve means of the tank.

Figure 3 is a top plan view of the valve seat.

Figure 4 is a sectional view of the valve relief.

Figure 5 is a cross sectional view through the hollow valve stem.

Referring to the drawings wherein like numerals designate like parts, it can be seen in Figure 1, that numeral 5 represents the ground which abuts the wall 6, numeral 7 represents the filler pipe extending from its threaded end 8 above the ground downwardly to the elbow 9 and from there to the elbow 10 and from there to the storage tank 11.

The storage tank 11 has a raised internally threaded collar 12 for receiving the lower externally threaded end portion of the neck 13 which is flanged at its upper end as at 14 to abut the inturned flange 15 at the lower end of the coupler 16. This coupler 16 receives the externally threaded sleeve 17 which at its lower end presses the packing gasket 18 against the outstanding flange 19 at the upper end of the tubular seat carrying structure 20. The upper end of the sleeve 17 is internally threaded to receive the externally threaded lower end of the pipe 7.

The structure 20 has the seat 21 and the leg 22 depending therefrom. Across the opening of the seat 21 is the spider 23 from which depends the cylindrical shell 24 which at its lower end has an inwardly disposed pin or the like 25 serving as a rest for the lower end of the tubular stem 26 of the valve 27. When the stem 26 is resting on the pin 25 the valve 27 is disengaged from the seat 21.

A pin 27' projects through an opening 28 in the shell 24 and extends through the slot 29 in the side of the stem 26, terminating in a head 30 which cannot be pulled through the slot 29.

The outer end of the pin 27' loosely connects to the upper end of the bellcrank 31, the bellcrank being swingably supported as at 32 by an ear 33 carried by the shell 24.

A connecting rod 34 extends downwardly from the lower end of the bellcrank 31 and extends through an over-sized opening in the arm 35 of the float 36 adjacent the leg 22, the float being fulcrumed by its arm 35 on the lower end of the leg 22 as at 37. The lower end portion of the rod 34 is threaded to accommodate the adjusting nut 34a.

The free end portion of the arm 35 has the plunger member 38 pivotally secured thereto as at 39, the upper end of the plunger 38 being pointed so as to readily engage the lower end of the stem 26 as suggested in Figure 2.

In the path of the arm 35 of the float 36 is the plunger rod 40 having the head 41 at the lower end thereof. This rod 40 extends through the upstanding tube 42 on the tank 11 and through the packing gland 43, the rod extending upwardly and terminating in the head 44 between which and the packing gland 43 a coiled compressible spring 45 is located for normally maintaining the plunger rod retracted upwardly.

At this point it may be noted that the top of the valve 27 is weighted offcenter as at 46 for the purpose of keeping the valve and its stem tilted in such a manner that the stem will rest on the pin 25 and maintain the valve unseated.

It can now be seen that when the tank has been filled almost to the capacity thereof, the float 36 will rise to such a point as to pull downwardly on the connecting rod 34 and tilt the bellcrank 31 so that the pin 27' and its head 30 will pull the stem 26 laterally to displace the same from the pin 25 so that the valve 27 will drop and become seated. This allows the fuel oil to bank up in the pipe 7 and when no further output is being registered by the delivery truck, the operator will know that the filler conduit is filled. He can then cut off the supply and then go into the basement of the house or wherever the tank 11 is located and push downwardly on the plunger rod 40 which will serve to push downwardly on the arm 35 so that the valve 27 will be unseated and this can be held in this position until the filler pipe 7 has been emptied.

While the foregoing specification sets forth the invention in specific terms, it is to be understood that numerous changes in the shape, size, and materials may be resorted to without departing from the spirit and scope of the invention as claimed hereinafter.

Having thus described the invention, what is claimed as new is:

1. In combination, a storage tank, a filler pipe extending to the tank, a float valve in the tank, the float valve including a valve element located at the tank end of the pipe, means for normally holding the valve in open position, said means including a seat forming part upon which a part of the valve rests, a float in the tank and means for moving said part of the valve off the seat by raising of the float in the tank, means extending into the tank for engaging the float to unseat the valve when drainage of the filler pipe is required and means actuated by lowering of the float for moving the valve upwardly upon the seat.

2. In combination, a storage tank, a filler pipe extending to the tank, a float valve in the tank, the float valve including a valve element located at the tank end of the pipe, said valve element comprising a stem and a head having an offset weighted portion, said weighted portion causing a tilting of the valve head and stem, a guide shell for the valve stem and a pin in the shell and engaging a part of the valve stem for holding the valve in unseated position while the tank is being filled and a float in the tank and means actuated by raising of the float for moving the valve stem off the pin and means actuated by lowering of the float for moving the valve and its stem upwardly to cause tilting movement of the valve and stem to engage the pin.

3. In combination, a storage tank, a filler pipe extending to the tank, a float valve in the tank, the float valve including a valve element located at the tank end of the pipe, said valve element comprising a stem and a head having an offset weighted portion, said weighted portion causing a tilting of the valve head and stem, a guide shell for the valve stem and a pin in the shell and engaging a part of the valve stem for holding the valve in unseated position while the tank is being filled, said float controlled valve including a float having an arm, a bellcrank, a connection between the bellcrank and the arm, means connected with the arm and connecting the valve stem for raising the valve and stem when the float lowers, to cause certain movement of the valve and stem to engage the pin and a connection between the bellcrank and the valve for displacing the same from the supporting pin when the tank approaches being filled to capacity.

CHARLES V. LINDLEY.